US006483026B1

(12) United States Patent
Snider, Jr. et al.

(10) Patent No.: US 6,483,026 B1
(45) Date of Patent: Nov. 19, 2002

(54) ADJUSTABLE HEIGHT CABLE RETAINING POSTS FOR CABLE LADDER PANELING SYSTEM

(75) Inventors: Randle Paul Snider, Jr., Plano, TX (US); Kevin C. Gentry, Princeton, TX (US); Marian Kutis, Richardson, TX (US); Joe Michael Jones, Garland, TX (US)

(73) Assignee: Ericsson Inc., Plano, TX (US)

( * ) Notice: Subject to any disclaimer, the term of this patent is extended or adjusted under 35 U.S.C. 154(b) by 31 days.

(21) Appl. No.: 09/641,421

(22) Filed: Aug. 18, 2000

(51) Int. Cl.[7] .................................................. H02G 3/04
(52) U.S. Cl. ...................... 174/48; 174/49; 174/68.1; 220/4.02; 52/220.7
(58) Field of Search ........................... 174/48, 50, 49, 174/95, 68.1; 220/4.02, 3.8; 52/220.7, 220.8; 248/49, 68.1, 73; 361/826, 827; 439/210, 205

(56) References Cited

U.S. PATENT DOCUMENTS

| 4,122,954 A | * | 10/1978 | Slater ........................ 211/133.4 |
| 4,369,945 A | * | 1/1983 | Mantoan et al. ............... 248/73 |
| 5,868,899 A | * | 2/1999 | Gundersen ................... 156/538 |
| 5,969,292 A | * | 10/1999 | Snider et al. .................. 174/48 |

OTHER PUBLICATIONS

U.S. patent application Ser. No. 09/641,630, Snider, Jr. et al.

* cited by examiner

Primary Examiner—Dean A. Reichard
Assistant Examiner—Dhiru R Patel

(57) ABSTRACT

An adjustable height cable retaining post (9) for leveling a panel system (20) around a cable ladder (30) in a telecommunications switching center (5). The adjustable cable retaining post (9) consists of a rod (50) and a C-shaped bracket (40). The adjustable cable retaining post (9) allows for a neat and orderly installation in a telecommunications switching center (5).

17 Claims, 6 Drawing Sheets

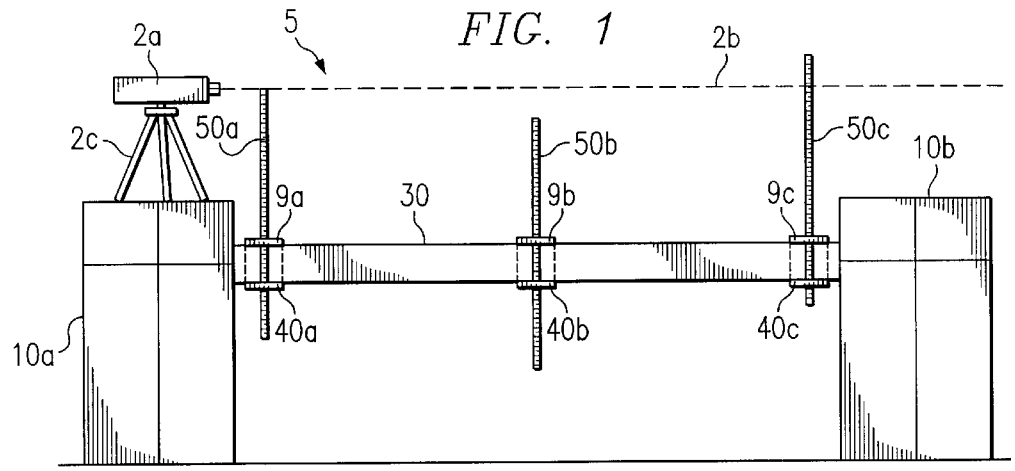
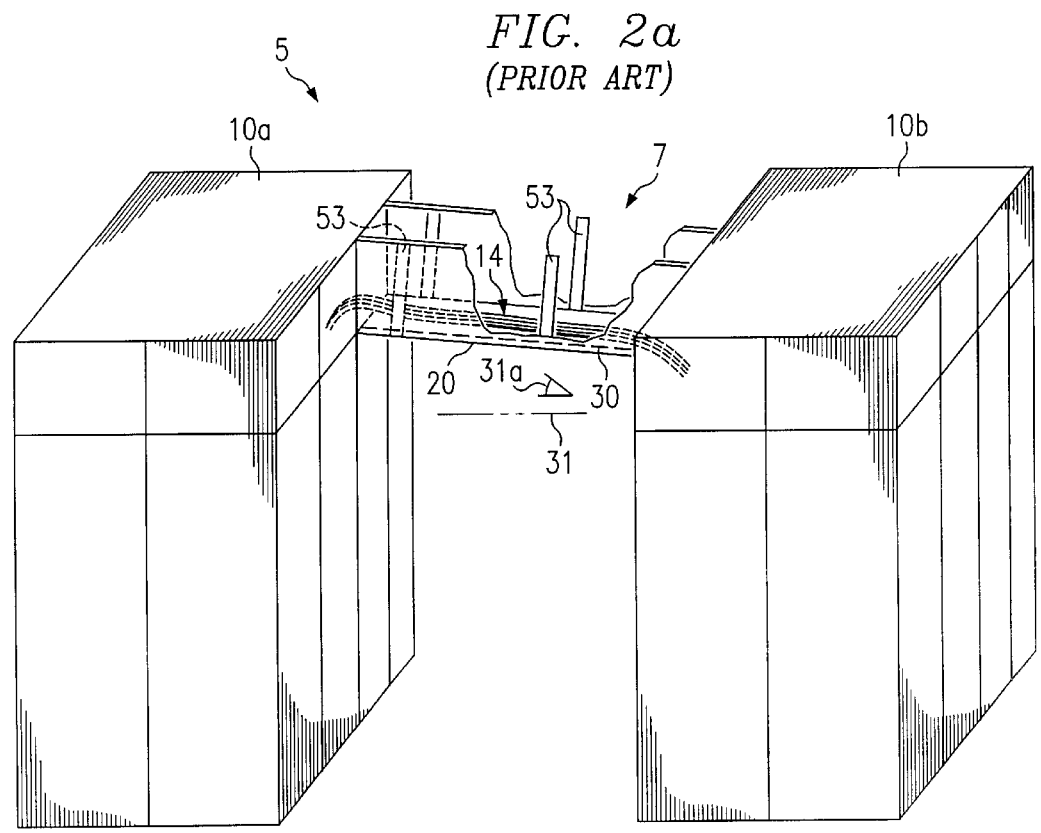

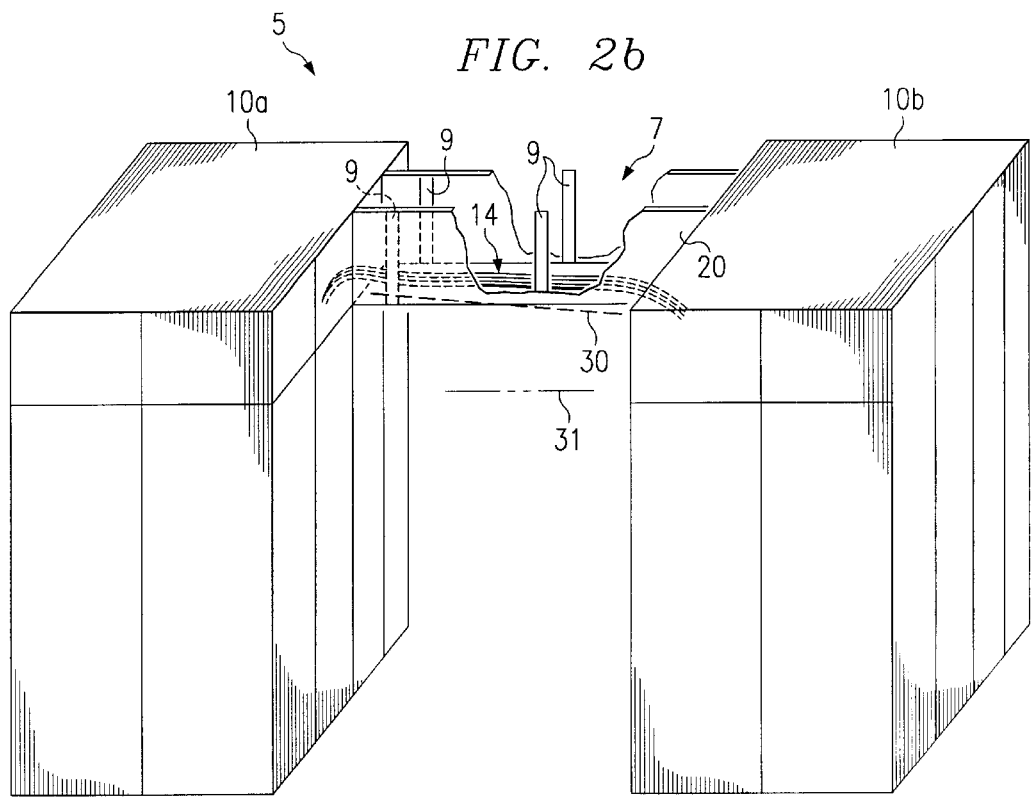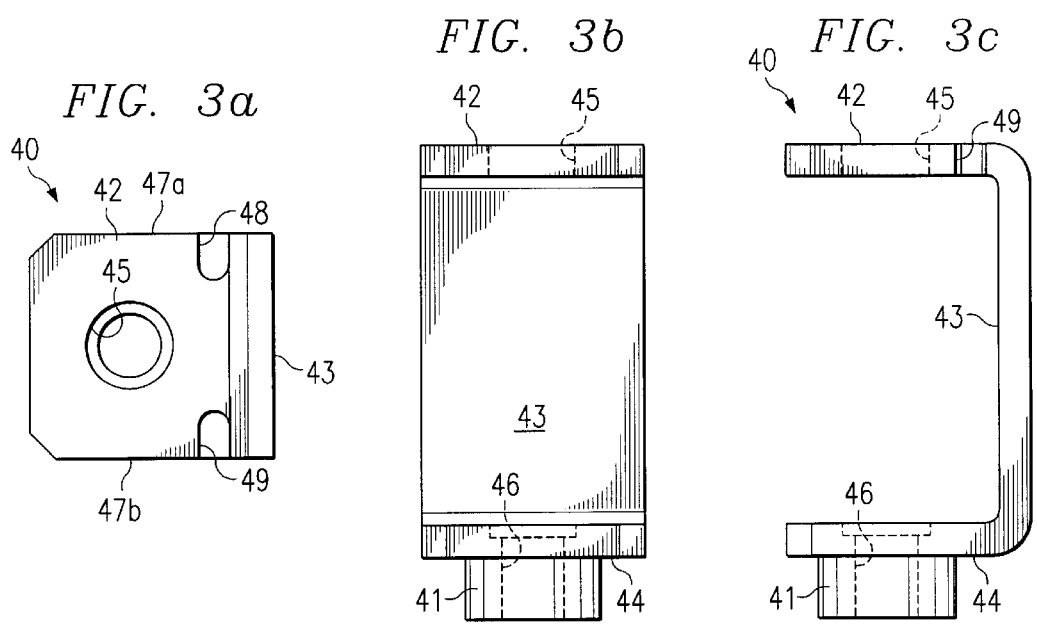

ADJUSTABLE HEIGHT CABLE RETAINING POSTS FOR CABLE LADDER PANELING SYSTEM

CROSS-REFERENCE TO RELATED APPLICATIONS

This application is commonly assigned and related to U.S. patent application Ser. No. 09/644,630 entitled "Aesthetic Panel System for a Cable Ladder" by Snider, Jr. et al. filed Aug. 18, 2000, the entirety of which is incorporated herein by reference (the "Related Application").

TECHNICAL FIELD

This invention relates in general to cable ladders used in telecommunications switching centers. More particularly, the invention relates to an adjustable height cable retaining post for a cable ladder.

BACKGROUND OF THE INVENTION

Without limiting the scope of the invention, its background is described in connection with cable ladders in a telecommunications switching center, as an example. The backbone of a telecommunications network consists of switching centers and either wireless or wireline communication links coupling the switching centers. A switching center is a place where telephone and electronic communications are routed from one point to another point in the network service area. The switches and equipment in a switching center are customarily mounted in a component cabinet for protection. Typically, component cabinets are installed in rows with cabinets placed side-by-side to form what is known in the industry as a "suite." Suites of component cabinets are also placed back-to-back to create a "double suite."

In order to route cables from equipment in one component cabinet to equipment in another component cabinet across an aisle, across the room, or even to another switching center, cable ladders are used to support the cables outside of the component cabinets. Cable ladders, also known as cable raceways, are used to route cables between telecommunications component cabinets. Typically, the cable ladders are installed at an overhead height which allows people to walk beneath the cable ladders to service the component cabinets.

Essentially, a cable ladder comprises an open ladder structure with multiple rungs between two parallel rails that serve to support the cables. The cable ladder has vertical posts attached to the rails to keep cables from falling over the sides of the cable ladder. Each of the vertical posts may be referred to as a "cable horn" or a "cable retaining post".

Those skilled in the art will recognize that switching centers are typically "ordered" environments so everything in a switching center has a proper place similar to a hospital operating room. Thus, neat and orderly cables are an important feature for a cabling system in a switching center. In order to maintain an orderly installation and give the cable ladder a neat appearance, the cables are often sewn onto the cable ladder. An installation technician typically loops a waxed string around a rung of the cable ladder, then the string is tightly sewn around the cables. Waxed string is used so the string will be less likely to slip and loosen with age.

Since the cables must be sewn at many intervals along a cable ladder to properly fasten the cables, it is a very labor intensive, time consuming, and expensive process. When a cable needs to be removed, a considerable amount of work is required to remove the cable, unsew it, replace it and resew the new cable in position. While this process would be easier if the cables were loose on the cable ladder, such an arrangement would be disorderly and unsightly. In addition, even when sewn together the cables are exposed to possible damage from falling objects or other accidental interferences.

Recently, a panel system has been developed to hide the cables routed over a cable ladder between component cabinets. A panel system of this type is disclosed in the Related Application. However, panel systems, such as those in the Related Application are installed on non-adjustable cable retaining posts. Thus, individual panels of the installed panel system may not be entirely level with respect to one another, due to, for example, variances in the installation such as an unlevel floor or other unlevel condition within the telecommunications switching center. In such instances, the panel system will be unlevel, slanted at an angle relative to the floor. As such the ability to adjust the panel system to accommodate an unlevel floor or other variances in the installation is desired.

For stability, ease of installation, and improved appearance, accordingly, a cabling system that eliminates the problems associated with the use of prior art, nonadjustable cable ladder panel systems would provide numerous advantages.

SUMMARY OF THE INVENTION

The following invention provides a cabling system and method for leveling a plurality of adjustable cable retaining posts along a cable ladder. An appropriate number of adjustable cable retaining posts are attached to the cable ladder and then adjusted so that the height of each post are at a uniform level and are attached so that the posts are generally level in relationship to either the switching center, the component cabinets, or other cable retaining posts. A leveling device can be used to align the cable retaining posts.

In one embodiment, the height of the cable retaining post is locked relative to the cable ladder. For example, a jam nut may be tightened against the adjustable cable retaining post to lock the post in place. Next, a panel system is placed over the cable ladder and installed on the adjustable cable retaining post. Finally, the level of the panel system is checked and each adjustable cable retaining post is adjusted for final placement of the panel system.

Also disclosed is a cabling system for a telecommunications switching center. The cabling system is capable of adjusting to accommodate disturbances such as uneven floors or cabinet manufacturing variances within the telecommunications switching center. The cabling system comprises two or more component cabinets, cables routed between the component cabinets, one or more cable ladders arranged to support the cables, and a plurality of adjustable cable retaining posts along the cable ladders. The adjustable cable retaining posts are generally level and square in relationship to either the switching center, the component cabinets, or other adjustable cable retaining posts.

In one embodiment, the cable retaining post comprises a rod and a means for adjustably attaching the rod to a cable ladder so that the rod is held in a vertical position along the side of the cable ladder and the rod is adjustable in height with respect to the cable ladder.

In another embodiment, the means for adjustably attaching the rod to the cable ladder is a C-shaped bracket. The C-shaped bracket has a top plate which fits over a side rail of the cable ladder. The top plate also has a hole adapted to receive the rod. The C-shaped bracket has a bottom plate which fits beneath the side rail and a hole which is threaded to engage a threaded portion of the rod. The top plate and the bottom plate are joined by a back plate. The C-shaped bracket is placed around the side rail of a cable ladder and the rod is inserted through the top hole and threaded into the bottom hole to lock the C-shaped bracket in place around the side rail of the cable ladder.

In another embodiment, a jam nut is also threaded onto the rod. The jam nut is tightened against the C-shaped bracket to lock the rod in place in the C-shaped bracket. This keeps the rod from rotating and moving up and down with respect to the cable ladder when a panel system is bolted to the top of the rod. For example, if the rod were not locked with respect to the C-shaped bracket and a panel system retaining bolt was tightened against the top of the rod, the rod could turn and move up or down, thus making the panel system installation unlevel. The top plate also has a left and right notch formed between the left and right edges of the top plate and the back plate. The notches allow the top plate to uniformly flex when the jam nut is tightened down against the top plate. If the notches were not in the top plate, the plate would bend and the rod would deflect out of the desired vertical position.

A technical advantage of the present invention is the ease of installation due to the simplicity of installing the C-shaped bracket and the rod on a cable ladder.

An additional technical advantage of the present invention is that it provides a means to level a panel system installed around the cable ladder as compared to the prior art systems.

BRIEF DESCRIPTION OF THE DRAWINGS

For a more complete understanding of the present invention, including its features and advantages, reference is made to the following detailed description of the invention, taken in conjunction with the accompanying drawings of which:

FIG. 1 depicts the use of a laser level to adjust the level of the cable retaining post, in accordance with one embodiment of the present invention;

FIG. 2A illustrates a prior art installation of the panel system with non-adjustable cable retaining posts;

FIG. 2B illustrates an installation of a panel system with adjustable cable retaining posts, in accordance with one embodiment of the present invention;

FIG. 3A shows a top view of the C-shaped bracket, according to one embodiment of the present invention;

FIG. 3B illustrates a front view of the C-shaped bracket, according to one embodiment of the present invention;

FIG. 3C depicts a side view of the C-shaped bracket, according to one embodiment of the present invention;

Corresponding numerals and symbols in the figures refer to corresponding parts in the detailed description unless otherwise indicated.

DETAILED DESCRIPTION OF PREFERRED EMBODIMENTS

Figure 3D:
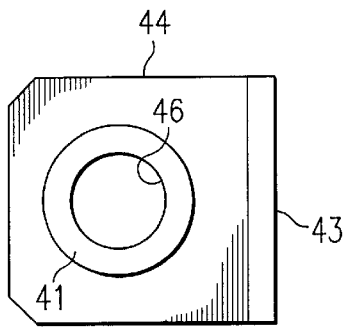
FIG. 3D illustrates a bottom view of the C-shaped bracket, according to one embodiment of the present invention.

While the making and using of various embodiments of the present invention are discussed in detail below, it should be appreciated that the present invention provides many applicable inventive concepts which can be embodied in a wide variety of specific contexts. These specific embodiments discussed herein are merely illustrative of specific ways to make and use the invention, and do not limit the scope of the invention.

Referring to FIG. 1, therein is shown the use of a laser level 2A to adjust the adjustable cable retaining posts 9A, 9B, 9C of the present invention. Specifically, FIG. 1 illustrates a telecommunications switching center 5 comprising a first component cabinet 10A, a second component cabinet 10B and a cable ladder 30. First, second and third adjustable cable retaining posts 9A, 9B, 9C, respectively, are placed along the cable ladder 30. Laser level 2A sits on top of a tripod stand 2C and emits a laser beam 2B, which is shown to extend across the length of the telecommunications switching center 5. As illustrated in the figure, the first cable retaining post 9A is at the proper level because it meets the laser beam 2B. However, the second cable retaining post 9B needs to be raised to meet the level of the laser beam 2B. The third cable retaining post 9C needs to be lowered so that it will be at the proper level with respect to the laser beam 2B. After the second and third cable retaining posts 9B, 9C are adjusted to the proper level, the rods 50 are locked in place in relationship to the cable ladder 30 by tightening a jam nut (not shown) down into the C-shaped bracket 40. Once the first, second and third cable retaining posts 9A, 9B, 9C have been locked in place, a panel system (not shown) may be placed around the cable ladder 30.

Alternatively, other methods of establishing the level of the first, second and third cable retaining posts 9A, 9B, 9C could be used, such as a string level, a carpenter's level, the eyesight of the installation technician, or other suitable means.

FIG. 2A illustrates a cabling system using a prior art cable ladder 30 with the non-adjustable cable retaining posts 53. In a telecommunications switching center 5, a cabling system 7 has been installed to allow cables 14 to be routed from a first component cabinet 10A across a cable ladder 30 and into a second component cabinet 10B. Due to irregularities in the floor of the telecommunications switching center 5, it can be seen that the cable ladder 30 and the panel system 20 covering the cable system are not level with respect to the floor or a reference line 31 indicated in the figure. Angle 31a is the angle between the reference line 31 and the panel system 20.

Those skilled in the art will appreciate that the figures referred to herein are not drawn to scale and some features have been enlarged in order to illustrate the major aspects of the cabling system 7. For convenience, the terms "cable" and "cables", "rung" and "rungs", "bolt" and "bolts", "rod"

and "rods" and "adjustable cable retaining post" and "adjustable cable retaining posts" will be referred to interchangeably throughout in connection with both the singular and plural forms of the terms and multiples of the same part will be identified with the same reference numeral both in the description and figures.

In order to accommodate irregularities such as an unlevel floor in a telecommunications switching center 5 or manufacturing variances between component cabinets 10A, 10B, the adjustable cable retaining posts 9 of the present invention can be used, with reference to FIG. 2B, cables 14 are routed from the first component cabinet 10A across the cable ladder 30 and into the second component cabinet 10B. The adjustable cable retaining posts 9 are adjusted to a uniform height. Thus, when the panel system 20 is installed over the cable ladder 30, the panel system 20 is parallel to the floor, which is indicated by reference line 31. By adjusting the panel system 20 so that it is level with respect to either the floor, the component cabinets 10A, 10B or other panel systems 20, the telecommunications switching center 5 maintains a neat and orderly appearance. Consequentially, even though the cable ladder 30 is not level with respect to reference line 31, the panel system 20 is level with respect to the reference line 31.

FIGS. 3A through 3E illustrate the preferred embodiment of a C-shaped bracket used as an attachment means to attach the rods 50 to the cable ladder 30. In FIG. 3A, a top view of the C-shaped bracket 40 is illustrated. The top plate 42 includes a top hole 45 joining the back plate 43. Two notches 48, 49 are formed between the top plate 42 and the back plate 43. The left notch 48 and the right notch 49 allow the top plate 42 to uniformly flex when the C-shaped bracket 40 is installed around the cable ladder 30.

FIGS. 3B and 3C are a front view and a side view, respectively, of the preferred embodiment of the C-shaped bracket 40. The front and side views illustrate how the top plate 42 and the bottom plate 44 are joined by the back plate 43. As shown, Top plate 42 has a non-threaded top hole 45 and the bottom plate 44 has a threaded hole 46 to receive the rod 50. The preferred embodiment provides the threads for hole 46 by welding a bracket nut 41 onto the bottom of the C-shaped bracket 40.

Figure 3E:
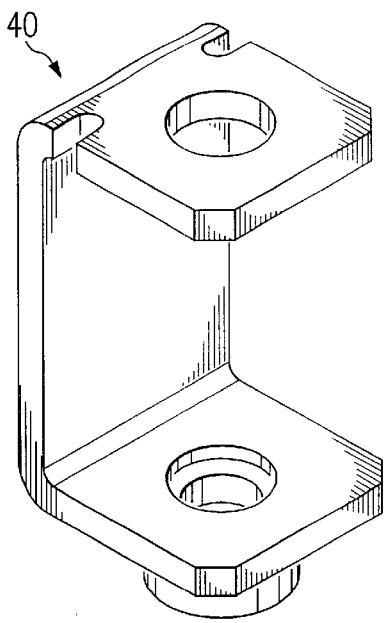
FIG. 3E depicts a perspective view of a C-shaped bracket, according to one embodiment of the present invention.

With reference to FIG. 3D, therein is shown a bottom view of the C-shaped bracket 40 in which the bracket nut 41 is concentric to the hole 46. FIG. 3E is a perspective view of the preferred embodiment of the C-shaped bracket 40, according to the invention. The C-shaped bracket 40 is typically made from a strip of metal. First, the top hole 45, the bottom hole 46, and the notches 48, 49 are stamped into a strip of metal. Next, the strip is bent to form the top plate 42, the back plate 43, and the bottom plate 44. Finally, the bracket nut 41 is welded into place on the bottom plate 44.

Figure 4A:
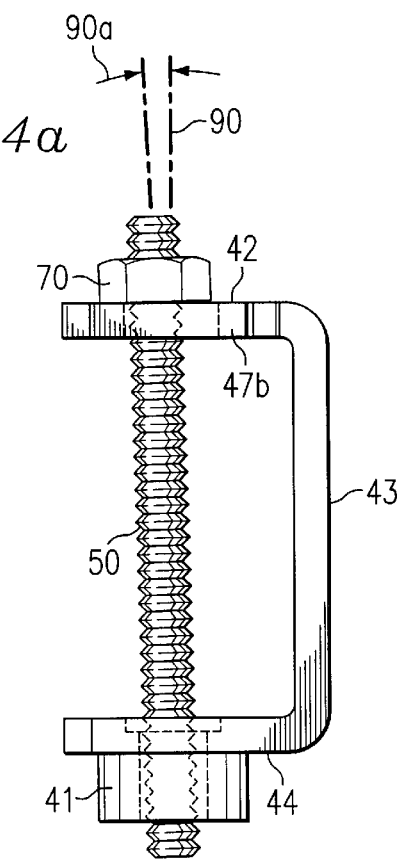
FIG. 4A illustrates a C-shaped bracket without notches, according to one embodiment of the present invention.

In FIG. 4A, a C-shaped bracket without notches is shown. Because the C-shaped bracket 40 does not have any notches, rod 50 deflects out of the desired vertical position when jam nut 70 is tightened down upon the top plate 42 of the C-shaped bracket 40. Deflection is shown relative to reference line 90 by angle 90A. For example, when the rod 50 deflects from its desired vertical position relative to the cable ladder 30, it is difficult to properly position the panel system 20.

Figure 4B:
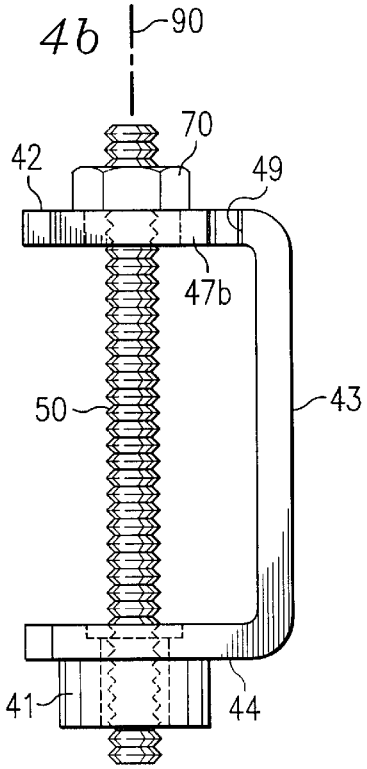
FIG. 4B illustrates a C-shaped bracket with notches, according to one embodiment of the present invention.

In FIG. 4B, a C-shaped bracket 40 with left and right notches 48, 49 is shown. The notches 48,49 allow for the top plate 42 to uniformly flex when the jam nut 70 is tightened down on the top plate 42, locking the rod 50 in place. As can be seen, since the top plate 42 uniformly deflects, it does not alter the position of rod 50, thus allowing rod 50 to remain in the desired vertical position relative to the cable ladder and reference line 90.

Figure 5B:
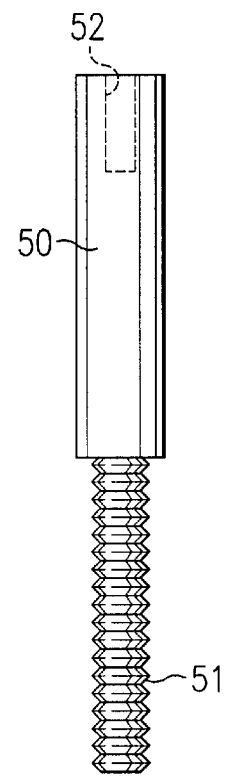
FIGS. 5A and B illustrate a cable retaining rod, according to one embodiment of the present invention.
Figure 5A:
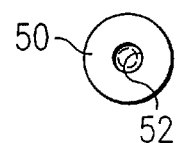

FIGS. 5A and 5B are a top view and a side view, respectively, of the preferred embodiment of the rod 50, according to the invention. Threaded hole 52 is shown in the top view of the rod 50. The threaded hole 52 allows the panel system 20 to be attached to the adjustable cable retaining post 9. The rod 50 also has a threaded lower portion 51 adapted to thread into the bracket nut 41 on the C-shaped bracket 40. For example, the threaded hole 52 is typically threaded with a ¼"×20 thread to accommodate bolts that are used by those skilled in the art to attach a panel system 20 to a cable ladder 30. The threaded lower portion 51 uses a ½"×13 thread, which is also a typical thread used in the industry, for joining parts of a cable ladder 30.

Figure 6:
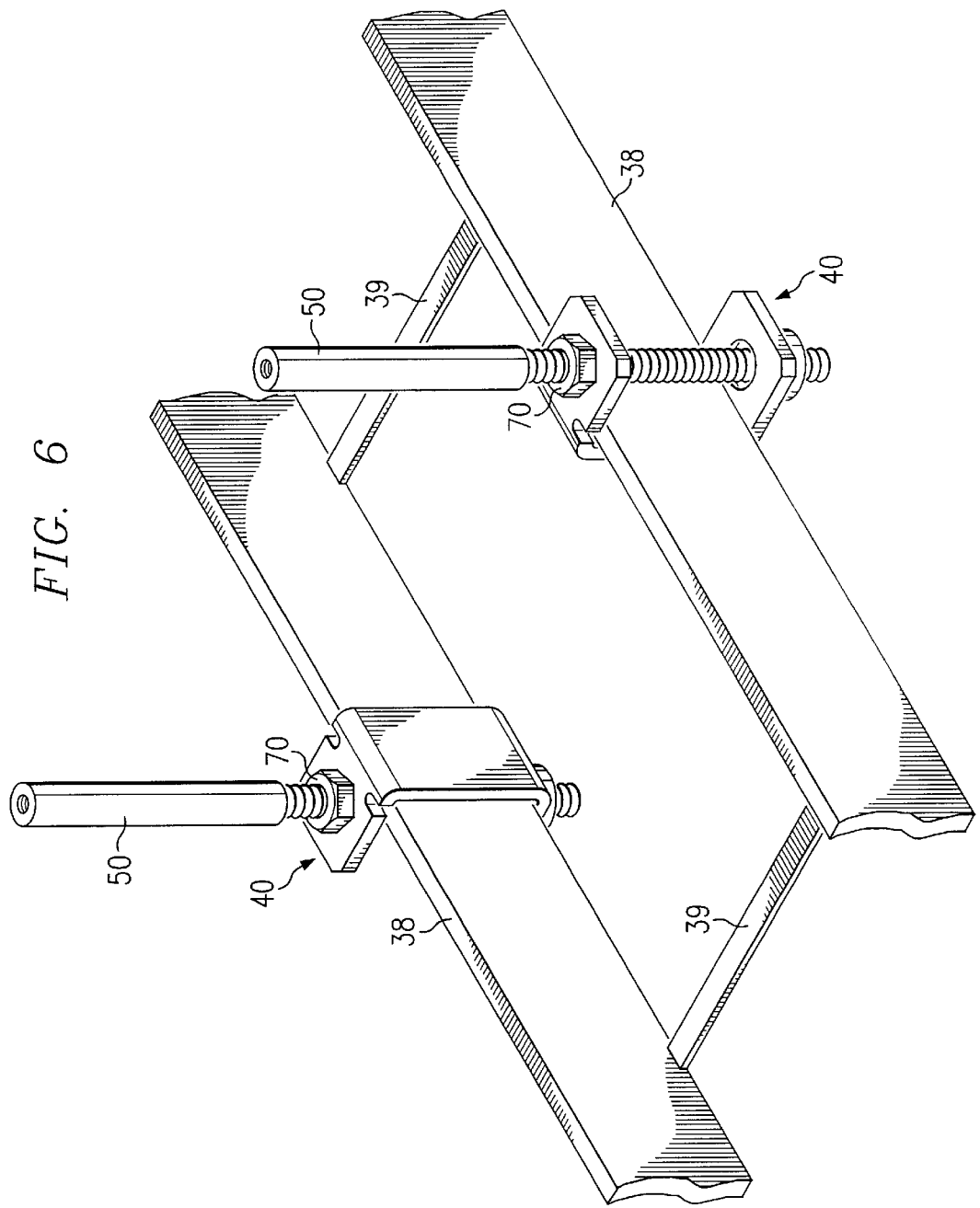
FIG. 6 depicts a cable ladder with adjustable cable retaining posts installed, according to one n embodiment of the present invention.

FIG. 6 illustrates the adjustable cable retaining posts 9 installed on a typical cable ladder 30. The cable ladder 30 comprises two side rails 38 joined by a plurality of rungs 39 spaced along the cable ladder 30. The cable ladder 30 is generally open between the rungs 39. Cables 14 are placed across the cable ladder 30 to be routed from one point to another point within the telecommunications switching center 5. A C-shaped bracket 40 is slid over the side rail 38 of the cable ladder 30. Then, the rod 50 is placed through the top and bottom holes 45, 46 of the C-shaped bracket 40 to lock the adjustable cable retaining posts 9 in place around the side rail 38. Adjustable cable retaining posts 9 are placed as needed along the side rails 38 of the cable ladder 30. Typically, the adjustable cable retaining posts 9 are placed adjacent to each other in pairs along the cable ladder 30.

Figure 7:
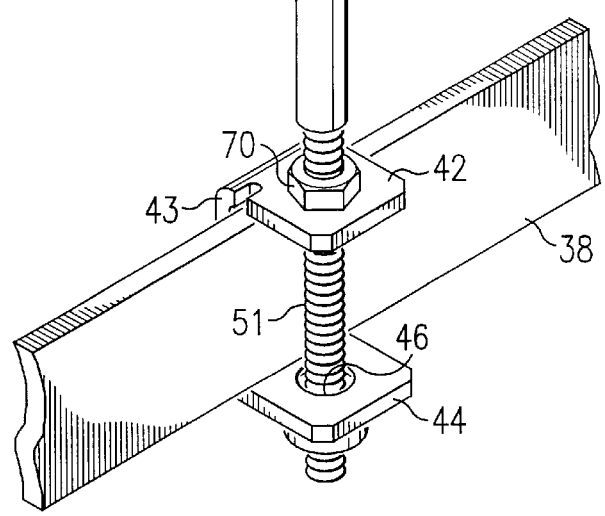
FIG. 7 is a detailed view of an adjustable cable post attached to a cable ladder, according to one embodiment of the present invention.

FIG. 7 further illustrates a detailed view of an adjustable cable retaining post 9 installed in place around the side rail 38 of the cable ladder 30. The C-shaped bracket 40 surrounds three of the four sides of the side rail 38 and the fourth side of the side rail 38 is trapped by the rod 50. The rod 50 is inserted through the top hole 45 in the top plate 42 and threaded into bottom hole 46 of the bottom plate 44 of the C-shaped bracket 40. Once the adjustable cable retaining post 9 has been positioned in the desired location along the side rail 38, a jam nut 70 is tightened down onto top plate 42. When the jam nut 70 is tightened, it locks the height of rod 50 in relationship to the cable ladder 30 and prevents the C-shaped bracket 40 from being able to move along the side rail 38.

Figure 8:
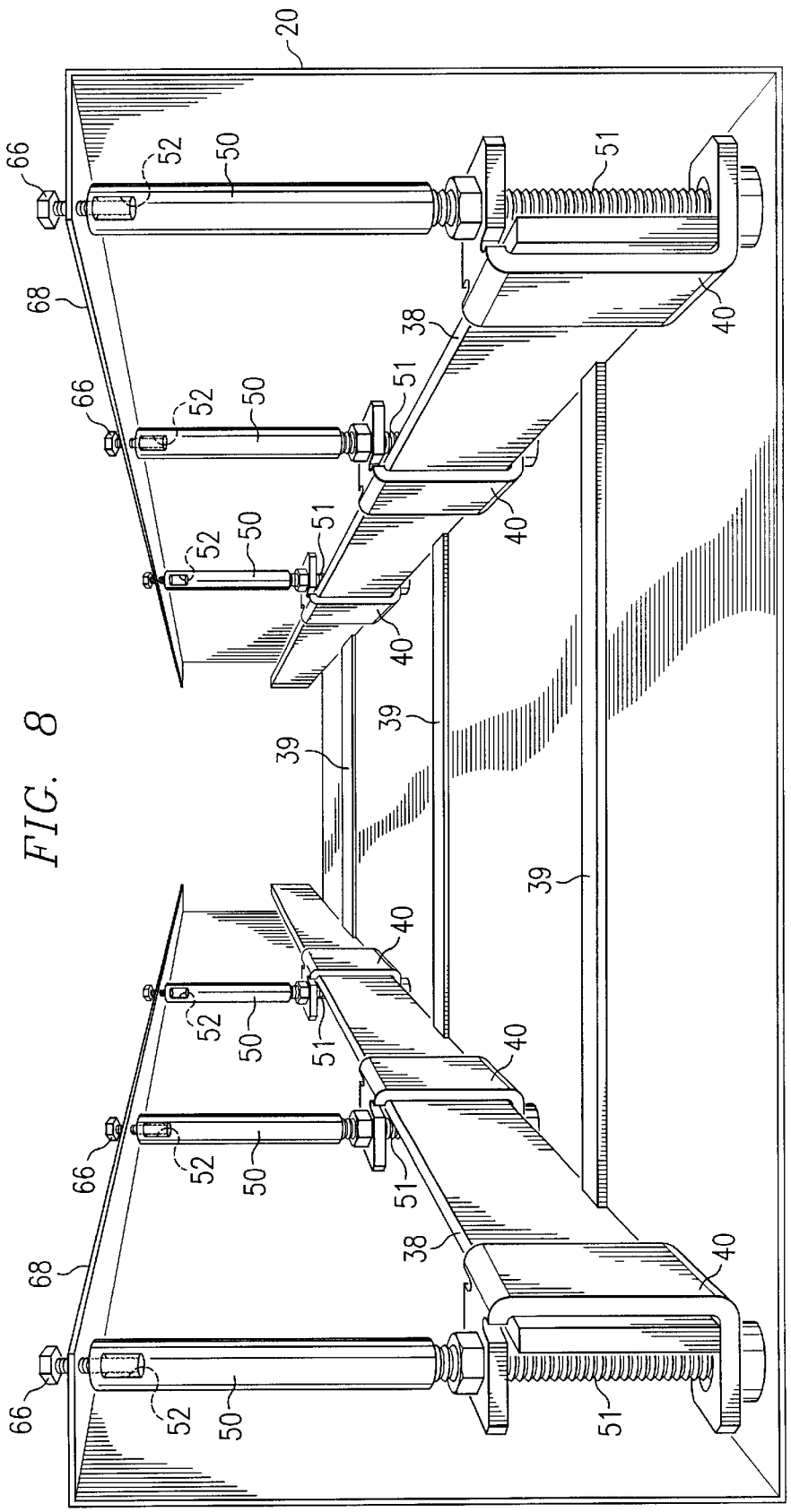
FIG. 8 illustrates a perspective view looking down a cable ladder with a panel system installed onto the adjustable cable retaining post, according to one embodiment of the present invention.

FIG. 8 illustrates a perspective view along a cable ladder 30 enclosed by a panel system 20 using the adjustable cable retaining posts 9 of this invention. C-shaped brackets 40 are installed along the side rails 38 of the cable ladder 30. The rods 50 have been adjusted to a uniform height in relationship to each other by using a level to help achieve the desired height.

Once the height of the rods 50 is set, the jam nuts 70 are tightened down against the top plates 42 of the C-shaped brackets 40, locking the adjustable cable retaining posts 9 into the proper position. The panel system 20 is lifted up and installed over the cable ladder 30 with the top flange 68 of the panel system 20 resting on top of the rods 50. Bolts 66 are then inserted through the top flange 68 of the panel system 20 and into the threaded hole 52 of each adjustable cable retaining post 9. This establishes a panel system 20 installation, which is quick to install and level when finished.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A cabling system for a telecommunications switching center, comprising:

a plurality of component cabinets;

one or more cables routed between said cabinets;

one or more cable ladders arranged to support said cables; and a plurality of adjustable cable retaining posts along said cable ladder, said posts being generally level and square in relation to either the switching center, the component cabinets, or other posts, wherein each said cable retaining post further comprises:

a rod; and means for adjustably attaching said rod to said cable ladder, so that said rod is held by said adjustable attachment means in a vertical position along said cable ladder and is adjustable in height with respect to said cable ladder.

2. The cabling system of claim 1 wherein said rod includes a threaded lower portion.

3. The cabling system of claim 1 wherein said attachment means is a C-shaped bracket.

4. The cabling system of claim 3 wherein said C-shaped bracket comprises:

a top plate over a side rail of said cable ladder, said top plate having a top hole adapted to receive said rod;

a bottom plate beneath said side rail, said bottom plate having a bottom hole adapted to engage said threaded lower portion of said rod; and a back plate joining said top plate and said bottom plate, said C-shaped bracket fitting over said side rail and said rod fastening said C-shaped bracket around said side rail.

5. The cabling system of claim 4 wherein said C-shaped bracket further comprises a bracket nut welded to said bottom plate, said bracket nut being concentric to said bottom hole and allowing the height of said rod to be adjusted with respect to said cable ladder.

6. The cabling system of claim 3 wherein said cable retaining post further comprises a jam nut, said jam nut being threadably engaged with said threaded lower portion of said rod and said jam nut is tighten against said C-shaped bracket.

7. The cabling system of claim 6 wherein said jam nut is above said top plate and installed tight against said top plate.

8. The cabling system of claim 7 wherein said top plate having a left and right notch, said left notch formed between the left edge of said top plate and said back plate and said right notch formed between the right edge of said top plate and said back plate, said left and right notches allowing the top plate to uniformly flex when said jam nut is tighten down against said top plate.

9. In a telecommunications switching center comprising a plurality of component cabinets and one or more cable ladders arranged to route cables amongst the cabinets, an adjustable cable retaining post attached to said cable ladder comprising:

a rod having a lower portion and a top; and means for adjustably attaching said rod to said cable ladder, so that said rod is held by said adjustable attachment means in a vertical position along said cable ladder and is adjustable in height with respect to said cable ladder.

10. The cable retaining post of claim 9 wherein said rod includes a threaded lower portion.

11. The cable retaining post of claim 9 wherein said attachment means is a C-shaped bracket.

12. The cable retaining post of claim 11 wherein said C-shaped bracket comprises:

a top plate over a side rail of said cable ladder, said top plate having a top hole adapted to receive said rod;

a bottom plate beneath said side rail, said bottom plate having a bottom hole adapted to engage said threaded lower portion of said rod; and a back plate joining said top plate and said bottom plate, said C-shaped bracket fitting over said side rail and said rod fastening said C-shaped bracket around said side rail.

13. The cable retaining post of claim 12 further comprising a bracket nut welded to said bottom plate, said bracket nut being concentric to said bottom hole and allowing the height of said rod to be adjusted with respect to said cable ladder.

14. The cable retaining post of claim 11 further comprising a jam nut, said jam nut being threadably engaged with said threaded lower portion of said rod and said jam nut is tight against said C-shaped bracket.

15. The cable retaining post of claim 14 wherein said jam nut is above said top plate and installed tight against said top plate.

16. The cable retaining post of claim 15 wherein said top plate having a left and right notch, said left notch formed between the left edge of said top plate and said back plate and said right notch formed between said right edge of said top plate and said back plate, said left and right notches allowing the top plate to uniformly flex when said jam nut is tighten down against said top plate.

17. The cable retaining post of claim 9 wherein the top of the rod is threaded for accepting a bolt.

* * * * *